US008723892B2

(12) United States Patent
Nishiya

(10) Patent No.: US 8,723,892 B2
(45) Date of Patent: May 13, 2014

(54) MAP DISPLAY CONTROL APPARATUS, MAP DISPLAY CONTROL METHOD AND COMPUTER READABLE MEDIUM

(75) Inventor: Akihiro Nishiya, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 502 days.

(21) Appl. No.: 13/052,230

(22) Filed: Mar. 21, 2011

(65) Prior Publication Data

US 2011/0234634 A1    Sep. 29, 2011

(30) Foreign Application Priority Data

Mar. 24, 2010    (JP) ................ P2010-067238

(51) Int. Cl.
*G09G 5/00*    (2006.01)
(52) U.S. Cl.
USPC ............................ 345/676; 345/636; 701/426
(58) Field of Classification Search
USPC ........................ 345/676, 636; 701/409, 426
See application file for complete search history.

(56) References Cited

U.S. PATENT DOCUMENTS

| 8,073,845 B2 | 12/2011 | Homma et al. |
| 8,204,877 B2 | 6/2012 | Uchida et al. |
| 2009/0293011 A1 | 11/2009 | Nassar |

FOREIGN PATENT DOCUMENTS

| JP | 10-326280 A | 12/1998 |
| JP | 2003-280518 A | 10/2003 |
| JP | 2006-72802 A | 3/2006 |
| JP | 2008-046987 A | 2/2008 |
| JP | 2009-093387 A | 4/2009 |
| JP | 2009-217585 A | 9/2009 |
| JP | 2009-258806 A | 11/2009 |
| JP | 2009-258808 A | 11/2009 |
| JP | 2009-266102 A | 11/2009 |

OTHER PUBLICATIONS

Japanese Office Action dated Apr. 19, 2012 (and English translation thereof) in counterpart Japanese Application No. 2010-067238.
Chinese Office Action dated Mar. 26, 2013 (and English translation thereof) in counterpart Chinese Application No. 201110076971.0.
Japanese Office Action dated Oct. 27, 2011 (and English translation thereof) in counterpart Japanese Application No. 2010-067238.

*Primary Examiner* — Maurice L McDowell, Jr.
(74) *Attorney, Agent, or Firm* — Holtz, Holtz, Goodman & Chick, PC

(57) ABSTRACT

A map display control apparatus includes: an accepting section configured to accept a search character; a search section configured to search for a landmark on a map, wherein a name of the landmark at least partly matches the search character; a position adjusting section configured to adjust a display position of the map such that the searched landmark search results appear in the map; a search refining section configured to perform a new search for the landmark and refine the landmark search results whenever a new character is added to the search character; and a position movement section configured to move the display position of the map, depending on a number of the refined landmark search results or a position of the refined landmark search results.

15 Claims, 7 Drawing Sheets

FIG. 3

| PLACE NAME | POSITION ||
| --- | --- | --- |
| | LATITUDE | LONGITUDE |
| ARTS ET MÉTIERS STATION | 48.865570 | 2.355745 |
| ABBESSES STATION | 48.884397 | 2.338150 |
| ARMAND TROUSSEAU HOSPITAL | 48.842161 | 2.406256 |
| AUBER STATION | 48.840749 | 2.309697 |
| ASSEMBLEE NATIONALE STATION | 48.854305 | 2.312486 |
| HÔTEL DE VILLE STATION | 48.858032 | 2.353642 |
| PICASSO MUSEUM MUSEU PICASSO | 48.859952 | 2.361796 |
| LONGCHAMP RACE TRACK | 48.857439 | 2.233522 |
| CHAMP-DE-MARS PARK | 48.854841 | 2.299225 |
| MONT PARNASSE CEMETERY | 48.838405 | 2.326820 |
| ROTHSCHILD HOSPITAL | 48.843235 | 2.398746 |

[INITIAL DISPLAY]

SEARCH CHARACTER: "A"

[SEARCH RESULT DISPLAY]

MAP DISPLAY CONTROL APPARATUS, MAP DISPLAY CONTROL METHOD AND COMPUTER READABLE MEDIUM

CROSS-REFERENCE TO RELATED APPLICATION

This application claims priority from Japanese Patent Application No. 2010-067238, filed on Mar. 24, 2010, the entire contents of which are hereby incorporated by reference.

BACKGROUND

1. Technical Field

Embodiments described herein relate to a map display control apparatus, a map display control method and a computer readable medium.

There is a significant trend recently towards high specification mobile phones, and, for example, mobile phones are becoming common that employ a Global Positioning System (GPS) function and are capable of displaying a map of the current vicinity. Using such mobile phones gives the convenience of being able to confirm your own current location in unfamiliar territory. However, it would be even more convenient, for example, if as well as the current location, certain landmarks could be searched for and the search results displayed on the map.

2. Related Art

A technique is described in JP-A-10-326280 below for identifying and displaying on a map the position of landmarks found to correspond to a given input character string. However, there is no particular mention in this technique of measures to adopt when many landmarks are found, and so the technique suffers from a difficulty in picking out the position of a desired landmark from among many landmarks.

In JP-A-2006-72802 below, a technique called "search refining" is described for picking out a desired landmark from with many landmarks. This is accomplished with pre-set hierarchical structure search conditions and by specifying in sequence pre-set hierarchical data, for example "country", "prefecture", "city", "town".

However, while JP-A-2006-72802 is superior to JP-A-10-326280 from the perspective that a desired landmark can be picked out from among many landmarks, the second related art suffers from having no flexibility in the method of refining the search. This is because refinement can only be made by specifying in sequence the pre-set hierarchical data, such as "country", "prefecture", "city", "town", "area". Search conditions not set in advance, such as a search keyword of JP-A-10-326280, need to be keyed in by hand each time.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Embodiments described herein provide a map display control apparatus, a map display control method and a computer-readable medium capable of efficiently refining a search, and capable of rapidly displaying a desired landmark on a map.

According to one or more aspects of the present invention, there is provided a map display control apparatus. The apparatus includes: an accepting section configured to accept a search character; a search section configured to search for a landmark on a map, a name of the landmark at least partly matching the search character; a position adjusting section configured to adjust a display position of the map such that the searched landmark appears in the map; a search refining section configured to perform a new search for the landmark and refine the landmark whenever a new character is added to the search character; and a position movement section configured to move the display position of the map, depending on the number of the refined landmark or a position of the refined landmark.

According to one or more aspects of the present invention, there is provided a map display control method. The method includes: (a) accepting a search character; (b) searching for a landmark on a map, a name of the landmark at least partly matching the search character; (c) adjusting a display position of the map such that the searched landmark appears in the map; (d) performing a new search for the landmark and refining the landmark whenever a new character is added to the search character; and (e) moving the display position of the map, depending on the number of the refined landmark or a position of the refined landmark.

According to one or more aspects of the present invention, there is provided a computer-readable medium storing a program for causing the computer to perform following operations. The operations include: (a) accepting a search character; (b) searching for a landmark on a map, a name of the landmark at least partly matching the search character; (c) adjusting a display position of the map such that the searched landmark appears in the map; (d) performing a new search for the landmark and refining the landmark whenever a new character is added to the search character; and (e) moving the display position of the map, depending on the number of the refined landmark or a position of the refined landmark.

Other aspects and advantages of the present invention will be apparent from the following description, the drawings and the claims.

BRIEF DESCRIPTION OF THE DRAWINGS

Exemplary embodiments of the present invention will be described in detail based on the following figures, wherein:

FIG. 3 is a diagram of a structure of supplementary data 6b;

DETAILED DESCRIPTION OF EXEMPLARY EMBODIMENTS

Hereinafter, exemplary embodiments of the present invention will be now described with reference to the drawings. It should be noted that the scope of the invention is not limited to the illustrated example.

Figure 1:
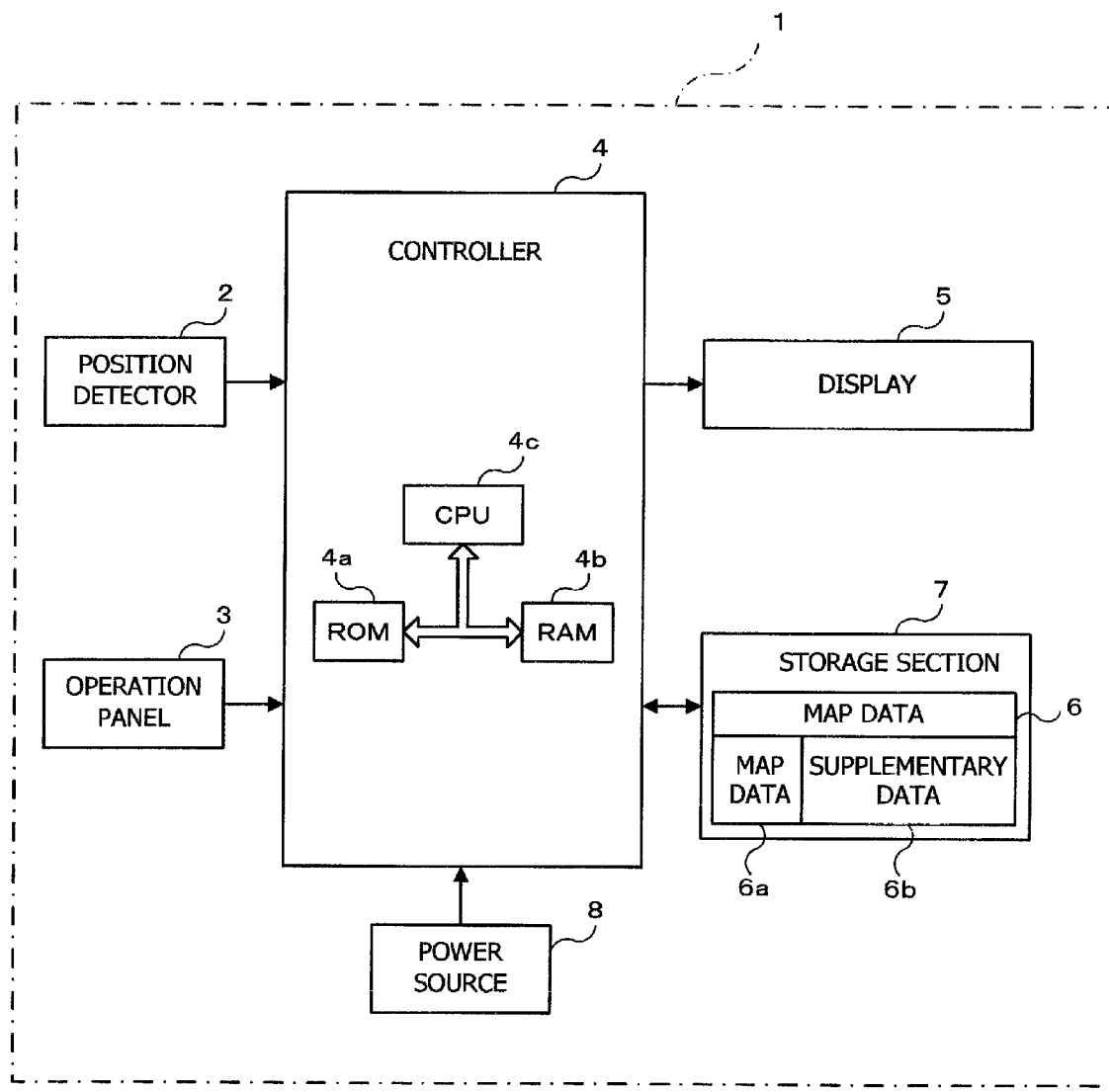
FIG. 1 is a configuration diagram of a map display control apparatus according to an exemplary embodiment.

FIG. 1 is a configuration diagram of a map display control apparatus according to an exemplary embodiment. The map display control apparatus 1 is provided with: a position detector 2 for picking up radio waves from GPS satellites and detecting the current position (coordinates, such as in longitude and latitude); an operation panel 3 with various types of operation key, such as character keys and a cursor key; a controller 4 that performs necessary control to operate the map display control apparatus 1 by reading a program pre-stored in Read Only Memory (ROM) 4a into Random Access Memory (RAM) 4b and executing the program with a Central Processor Unit (CPU) 4c; a display 5, such as a liquid crystal display; a storage section 7 in which map data 6 is stored; and a power source 8 containing a battery.

In addition to the above configuration, the map display control apparatus 1 also may be configured with, for example, a communication section capable of accessing a network (such a network includes a public communication line network, such as telephone lines) such as the Internet, through the nearest base station of a mobile phone or wireless Local Area Network (LAN) access port. In such cases configuration may be made to enable access to a map data server on a network via the communication section. When utilizing a map data server on a network, all of or a portion of the map data 6 on the storage section 7 may be understood to be map data provided by the map data server.

Figure 2:
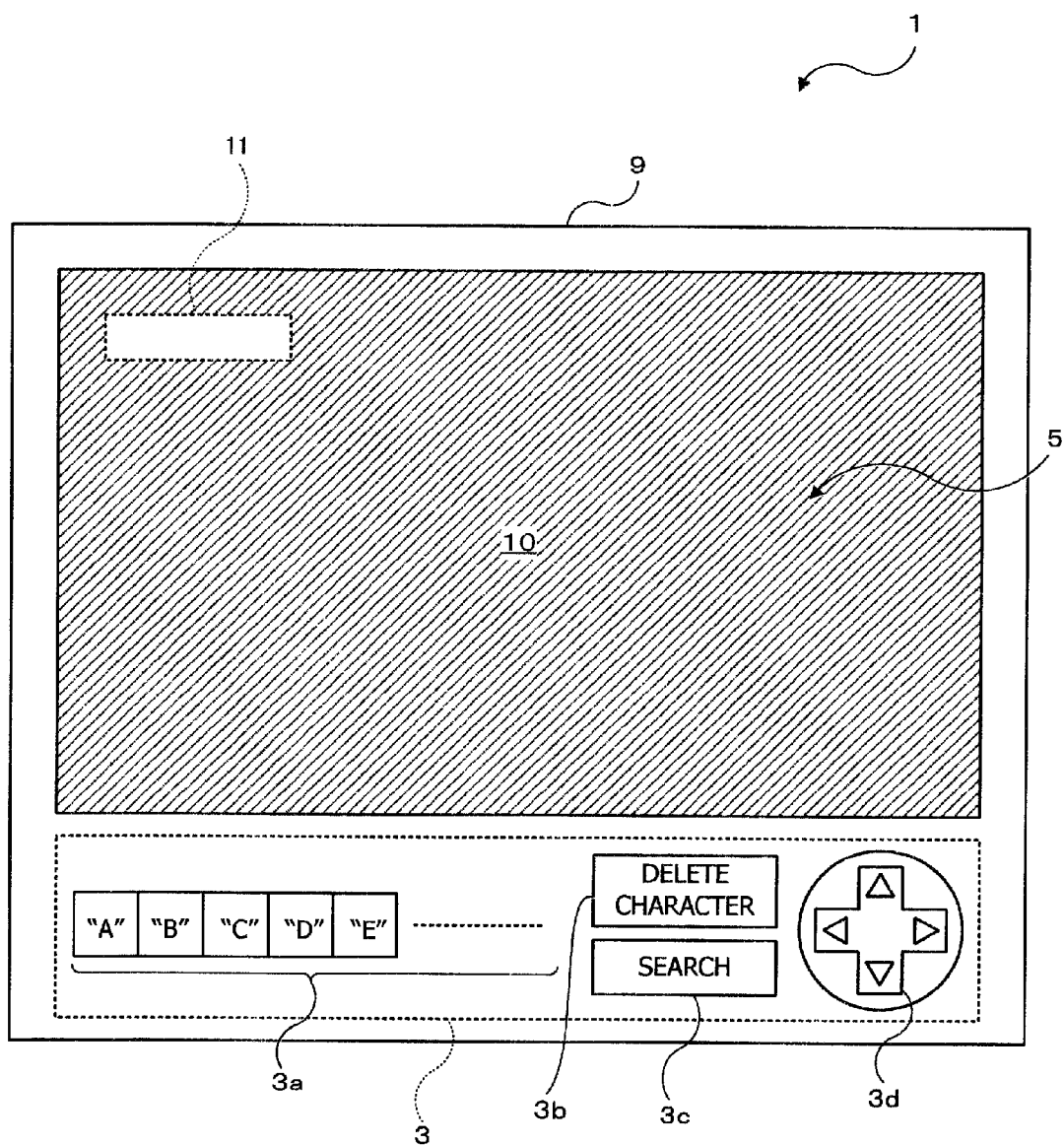
FIG. 2 shows the external appearance of an example of a map display control apparatus 1.

FIG. 2 is a diagram of an external appearance of an example of the map display control apparatus 1. The map display control apparatus 1 has the display 5 disposed in a case 9, and the operation panel 3 disposed below the display 5. The operation panel 3 includes character keys 3a, a character deletion key 3b, a search key 3c and a cursor key 3d.

The character keys 3a are keys for inputting desired characters, such as alphabet, hiragana characters, katakana characters. For example, configuration may be made with character keys like those of a PC keyboard or like the ten-keys on a mobile phone. However, for ease of explanation, configuration with character keys 3a capable of entering katakana characters from the phonetic character "a" to the phonetic character "n" will be used. In this case, the 10 keys for the "a-column" to the "z-column" are provided, and each row of the characters in the columns is selected according to the number of times the respective key is operated.

The external appearance configuration shown in the drawing is merely an example thereof. For example, other keys may be added to the operation panel 3 or used to replace any of the above keys. A display 5 with a touch panel may be used, with a keyboard graphic displayed on the display 5 and used in place of the operation panel 3.

Configuration is made such that when the map display control apparatus 1 is operated, a map display region 10 is displayed on the display 5 with hatching, and a character input box 11 is displayed superimposed on a portion of the map display region 10 (at the top left hand corner in the drawing). Directly after starting up the map display control apparatus 1, the map display region 10 displays a map (one read from the map data 6) of the area in the current vicinity of a user (a person carrying the map display control apparatus 1). The user can ascertain his/her own position by looking at this map and confirm whether or not a landmark being aimed for is displayed on the map. When the landmark is displayed, the direction to the landmark and the distance and route to the landmark can be figured out. When the landmark is not displayed, a search can be executed by input of suitable characters to the character input box 11.

The map data 6 is digital maps, configured with map data 6a and supplementary data 6b. The map data 6a is configured by line data and image data for configuring a map, such as aerial photographs. The supplementary data 6b is configured with character data relating to various landmarks on the map. When using a digital map such as this, generally a sequence is followed in which, first, character data (supplementary data 6b) is searched to find position data of the desired landmark, then, a map region of specific range centered around the position data is read out from the map data 6a and displayed.

FIG. 3 is a diagram of a structure of the supplementary data 6b. The supplementary data 6b is configured from a place name field 12 in which place names (names of landmarks) are held, a position field 13 in which position data of these places is held. The position field 13 is further configured with a latitude field 14 and a longitude field 15. For ease of explanation, street map data of Paris city in France is used for the supplementary data 6b held. The place names are also merely employed so show examples.

Explanation now follows regarding operation.

Figure 4:
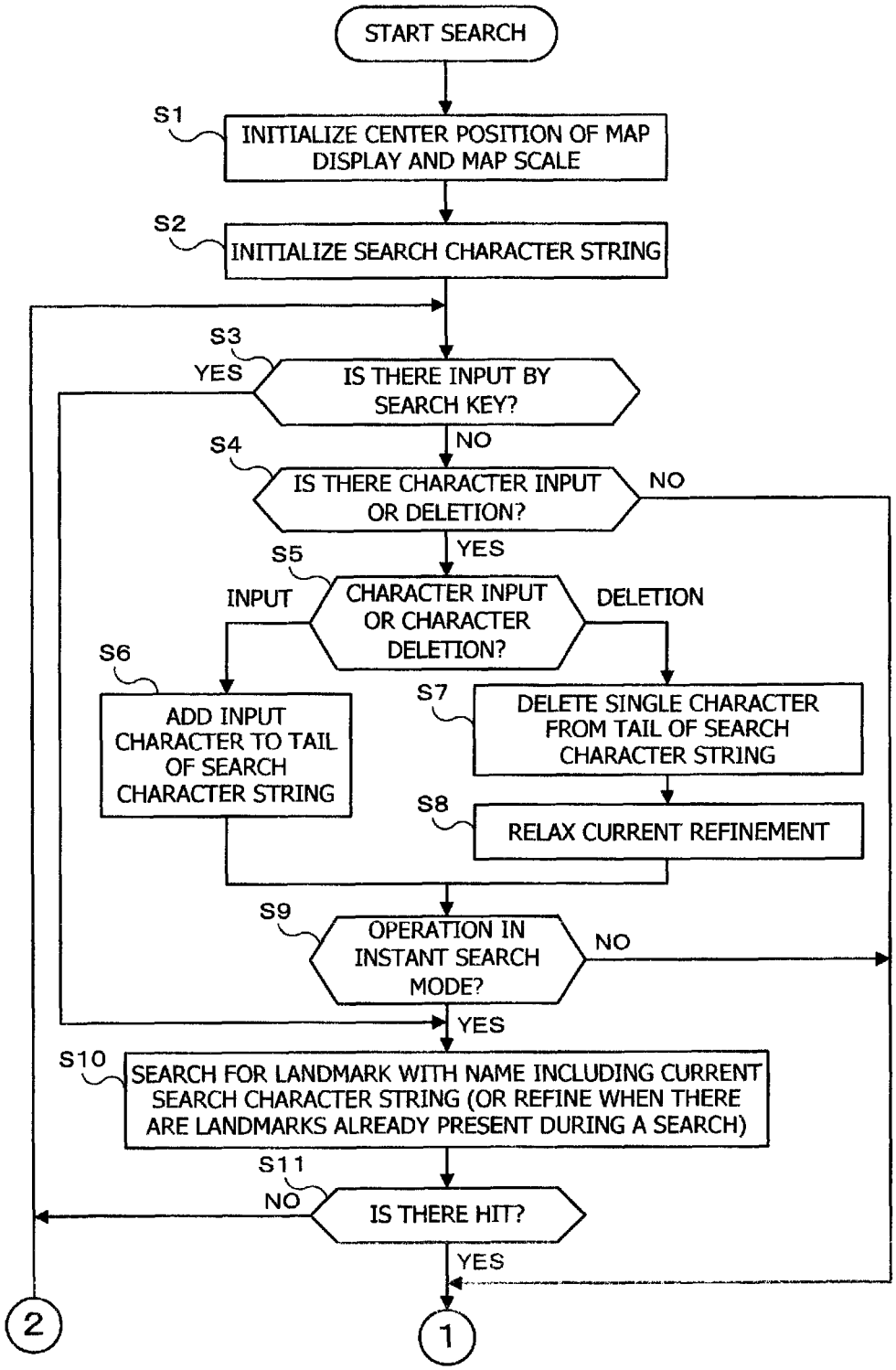
FIG. 4 is an operational flow chart (1/2) of search processing.
Figure 5:
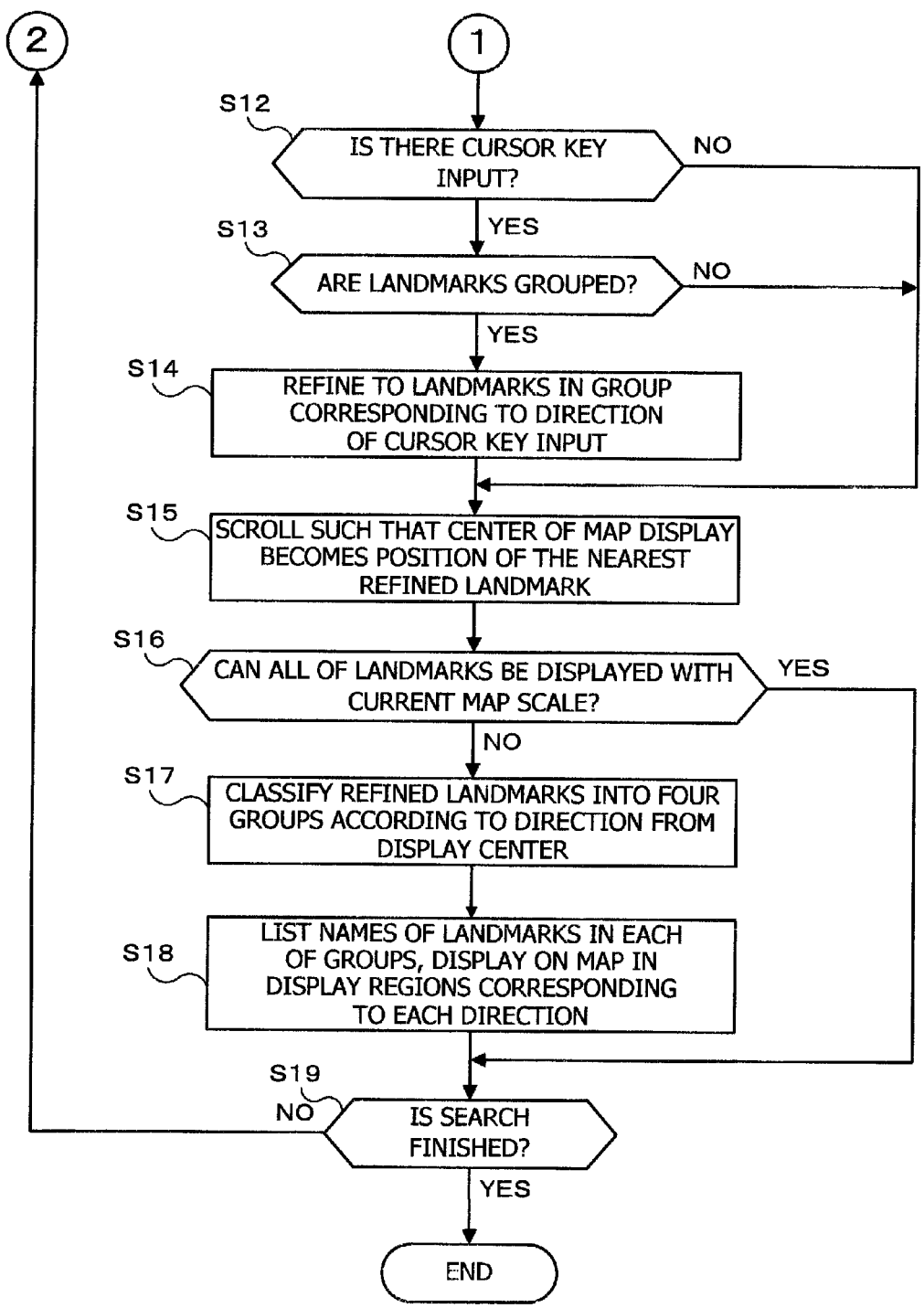
FIG. 5 is an operational flow chart (2/2) of search processing.

FIG. 4 and FIG. 5 show an operation flow chart for "search processing" in a program executed by the controller 4.

When the search processing is started, first display of the display 5 is initialized. Namely, at step S1, the center position of the map display is aligned to the current position (the position detected by the position detector 2) and the scale of the map is set to a specific scale. At step S2, the content of the character input box 11 is also initialized (cleared).

It is possible to automatically initialize the center position of the map display using the position is detected by the position detector 2 when searching for and displaying a landmark in the vicinity of a place actually being visited, such as a holiday destination. However, in order to search for and display a landmark of a place not actually being visited at the time, the center position of the map display may be initialized by a user designating a desired location on a map.

When initialization is complete, then, at step S3, whether or not of the search key 3c has been operated is determined Processing proceeds to step S10 when it is determined that the search key 3c has been operated, and processing proceeds to step S4 when it is determined that the search key 3c has not be operated, where determination is made as to whether or not there is character input or character deletion. "Character input" here means an operational action to input given characters to the character input box 11 of the display 5 using the character keys 3a of the operation panel 3. "Character deletion" here means an operational action to delete the final character in a character string that has already been input to the character input box 11 using the character deletion key 3b.

Processing proceeds to step S12 when it is determined that there has been no character input or character deletion at step S4, and processing proceeds to step S5 when it is determined that there has been character input or character deletion, where determination is made as to whether it is "character input" or "character deletion".

When "character input", the input character string is added to the end of the search character string at step S6. When "character deletion", a single character is deleted from the end of the search character string at step S7, and the current refinements are relaxed at step S8.

Next, at step S9, determination is made as to whether or not operation is in instant search mode. "Instant search mode" means a mode in which search is executed instantly for each single character input to the character input box 11 of the display 5. In this mode, for example, when inputting a character string that will finally be "abcd", at the time when the first single character ("a") is input, landmarks with "a" as the leading character are searched for immediately. When the second character ("b") is input, landmarks with "ab" as the leading characters are searched for immediately. When the third character ("c") is input, landmarks with "abc" as the leading characters are searched for immediately. When the fourth character ("d") is input, landmarks with "abcd" as the leading characters are searched for immediately. Instant search mode is a convenient mode in which the desired search result can often be obtained even without inputting all the way up to the final character.

When it is determined at step S9 to be operating in instant search mode, processing proceeds to step S10 where search for names of landmarks containing the current search character string is made (or refined when there are landmarks already present during a search). Processing proceeds to step S12 when it is determined at step S9 not to be operating in instant search mode, where determination is made as to whether or not the cursor key 3d has been operated.

When the processing of step S10 has been performed, namely when processing to search for landmarks with names including the current search character string has been performed (or refined when there are landmarks already present during a search), processing then proceeds to step S11 where determination is made as to whether or not there is a hit by from searching or refining, namely determination is made as to whether or not one or more search result has been obtained.

When there has not been a hit (when there are 0 search results), processing returns to step S3. When there has been a hit (when there are 1 or more search results), processing then proceeds to step S12 where determination is made as to whether or not the cursor key 3d has been operated. Processing proceeds to step S15 when the cursor key 3d has not been operated, and processing proceeds to step S13 when the cursor key 3d has been operated, where determination is made as to whether or not the landmarks obtained in the search results are already grouped.

"Grouped" here means classifying the position of each of the landmarks obtained in the search results to respective directions from plural partitioned directions with the current position at the center (for example, north, south, east, west).

Figure 6:
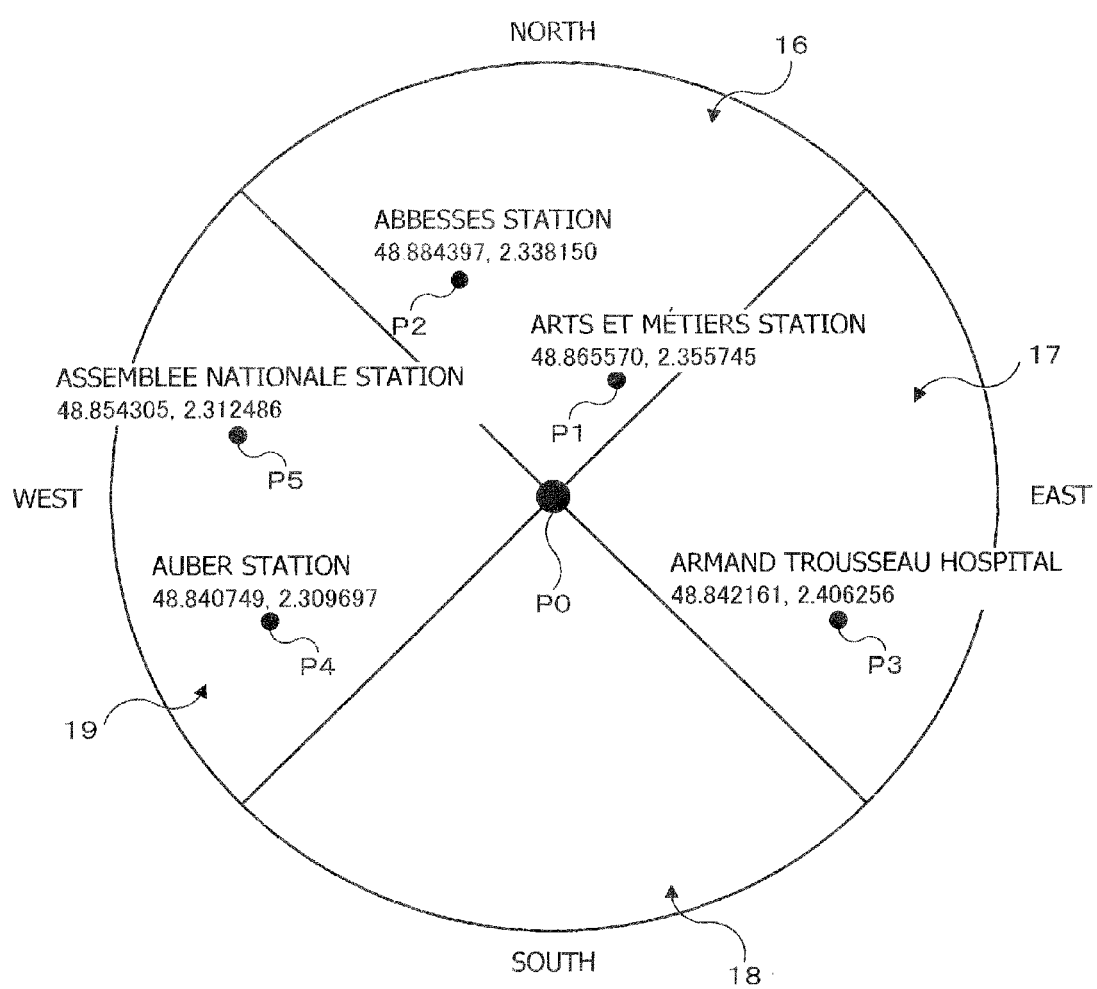
FIG. 6 is schematic diagram of grouping.

FIG. 6 is a schematic diagram of grouping. In this diagram, P0 indicates the current position of the user, and four regions 16 to 19 are set in each of the directions north, south, east and west, with P0 at the center. Region 16 is in the north direction, region 17 is in the east direction, region 18 is in the south direction and region 19 is in the west direction.

It is assumed that, as a result of the search of step S10, there were hits of the following 5 landmarks.

First landmark: Arts et Métiers Station (latitude: 48.865570/longitude: 2.355745)

Second landmark: Abbesses Station (latitude: 48.884397/longitude: 2.338450)

Third landmark: Armand Trousseau Hospital (latitude: 48.842161/longitude: 2.406256)

Fourth landmark: Auber Station (latitude: 48.840749/longitude: 2.309697)

Fifth landmark: Assemblee Nationale Station (latitude: 48.854305/longitude: 2.312486)

The first to the fifth landmarks are then classified to each of the regions 16 to 19 based on their respective position data (latitude and longitude) as shown in FIG. 6. Namely, in the current search example, the position P1 of the first landmark and the position P2 of the second landmark are classified to the region 16, the position P3 of the third landmark is classified to region 17, the position P4 of the fourth landmark is classified to region 19.

Classifying the landmarks obtained in the search results according to their positions in respective regions 16 to 19 is called "grouping". The directions of the regions 16 to 19 (north, south, east, west) are merely examples.

Processing proceeds to step S15 when determination result at step S13 is NO, namely when the landmarks are not grouped. Processing proceeds to step S14 when the determination result at step S13 is YES, namely when the landmarks are grouped, where the operation direction of the cursor key 3d is then determined The cursor key 3d may be a general purpose key capable of up-down and left-right operation, however in this exemplary embodiment, a key for selectively designating each of the regions 16 to 19 of FIG. 6 is employed. Namely, each of the directions "up", "down", "left" and "right" of the cursor key 3d can be thought of as being each of the directions "north", "south", "west" and "east", respectively. The north direction region 16 is selected when upward operation is performed, the south direction region 18 is selected when downward operation is performed, the west direction region 19 is selected when leftwards operation is performed, and the east direction region 17 is selected when rightward operation is performed. In this example, the landmarks to be subjected to search are refined to the landmark positioned in the east direction region 17.

Then, at step S15, the center position of the map display is moved. When this is performed, the target position for moving is a landmark positioned in the region selected by the cursor key 3d in step S14, and is the position of the landmark nearest to the current position P0 from the landmarks currently refined as subjects for search. In the example of FIG. 6, for example, when the north direction region 16 is selected with the cursor key 3d, from out of the two landmarks positioned in region 16 (the first landmark and the second landmark), since the position P1 of the first landmark is nearest to the current position P0, the center position of the map display is moved to the position P1 of the first landmark. While configuration may be made such that movement of the map is performed instantly, preferably the map is moved smoothly, for example by performing a method such as scrolling, due to concern about an unpleasant feeling that might be imparted to a user by temporary blurring of an image with sudden movement. The position of each of the landmarks is shown on the map with a specific symbol.

When movement of the map display is finished, determination is made at step S16 as to whether or not all of the currently refined landmarks (all of the landmarks obtained by search at step S10 or all of the landmarks refined at step S14) are displayable with the current map scale. When this is possible, all of these landmarks have been displayed on the map display region 10 of the display 5, and then processing proceeds to step S19. However, when the determination result at step S16 is NO, namely when it is determined that one or more of the landmarks cannot be displayed with the current map scale, processing proceeds to step S17.

When it is determined that, from all of the landmarks currently refined, even one of the landmarks cannot be displayed with the current map scale, then the refined landmarks are classified into the four groups, based on the direction of the refined landmark from the display center. In this example "direction from the display center" means the four directions of north, south, east, west for the regions 16 to 19 in the example in FIG. 6. "Classified into the four groups" means that, for example, as in the example in FIG. 6, each of the first to the fifth landmarks is classified to the regions 16 to 19 according to the positions P1 to P5.

When group classification of the landmarks is finished, then, at step S18, the names of the landmarks ("Arts et Métiers Station", "Abbesses Station", "Armand Trousseau Hospital", "Auber Station", and "Assemblee Nationale Station" in the example of FIG. 6) in each of the groups (namely in each of the regions 16 to 19) are listed and displayed at specific positions on the map display region 10 of the display 5. "Specific positions on the map display region 10" means in the vicinity of the top edge of the map display region 10, the vicinity of the bottom edge thereof, the vicinity of the left edge thereof or the vicinity of the right edge thereof.

These specific positions (the vicinity of the top edge, the vicinity of the bottom edge, the vicinity of the left edge and the vicinity of the right edge) correspond one-to-one to the regions 16 to 19 on FIG. 6. Namely, the vicinity of the top edge corresponds to the north direction region 16, the vicinity of the bottom edge corresponds to the south direction region 18, the vicinity of the left edge corresponds to the west direction region 19, and the vicinity of the right edge corresponds to the east direction region 17.

Consequently, when the processing of step S18 has been executed, the names "Arts et Métiers Station" and "Abbesses Station" are displayed in the vicinity of the top edge of the map display region 10, the names "Auber Station" and "Assemblee Nationale Station" are displayed at the vicinity of the left edge, and the name "Armand Trousseau Hospital" is displayed at the vicinity of the right edge of the map display region 10.

Note that there is no name displayed in the vicinity of the bottom edge of the map display region 10. This is because, as shown in FIG. 6, there is no landmark classified to the south direction region 18 corresponding to the vicinity of the bottom edge.

When there is even one landmark that cannot be displayed with the current map scale, all of the landmarks currently refined, including the landmarks capable of being displayed with the current map scale, are listed for display at step S18. However, configuration may be made in which only the landmarks that cannot be displayed at the current map scale (the landmarks not displayed with a specific symbol on the map) are listed for display.

Figure 7:
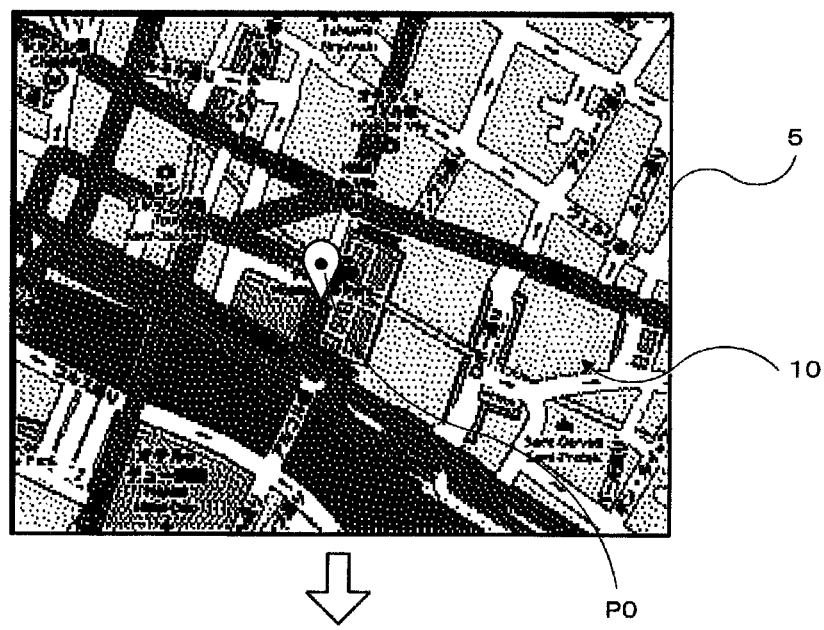
FIG. 7 is a diagram showing an example of a map search.
Figure 7:
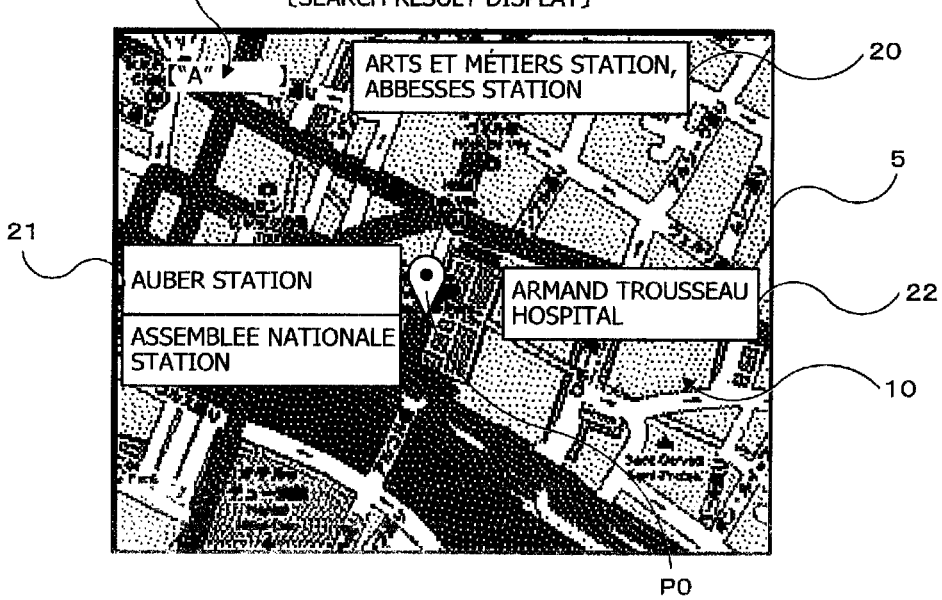

As described above, when search has been performed and display of the search results made, then, at step S19, determination is made as to whether or not search is completed. Determination that search is complete may be by detecting operation of a search-complete key of the operation panel 3, not shown in the drawings, or may be performed in response to detection of another operation event. When it is determined that search is completed, the program is ended, and when it is determined that search is not complete, processing returns again to step S3, and operation or not of the search key 3c is determined FIG. 7 is a diagram showing an example of a map search. The display state on the display 5 prior to search is shown by the picture at the top of FIG. 7. Namely, a mark indicating the current position P0 is displayed at the center of the map display region 10 of the display 5, and a map of the vicinity to this point is displayed with a specific scale. The character input box 11 is not yet displayed at this point in time. When initialization of the search character string has been performed at step S2 of FIG. 4, the character input box 11 appears at the top left corner of the map display region 10, and search character input is enabled.

For example, consider a case where the katakana character "a" has been input to the character input box 11. When operating in instant search mode, step S10 of FIG. 4 is executed in response to input of "a". When not operating in instant search mode, step S10 of FIG. 4 is executed in response to operation of the search key 3c.

The processing of step S10, as stated above, is to "search for names of landmarks containing the current search character string is made (or refined when there are landmarks already present during a search)", hence in step S10, a search is performed on the map data 6, using the katakana character "a" input to character input box 11 as the keyword.

The search is performed with reference to the supplementary data 6b of FIG. 3. Namely, since there are 5 place names with the character "a" at the leading position, "Arts et Métiers Station", "Abbesses Station", "Armand Trousseau Hospital", "Auber Station", and "Assemblee Nationale Station", these 5 place names (the first to the fifth landmarks) are obtained as the search result.

Position data (latitude and longitude) for these 5 landmarks is then extracted from the supplementary data 6b, and, based on the position data, determination is made at step S16 as to whether or not all of the landmarks (the first to the fifth landmarks) are displayable on the map with the current map scale, and the scale is determined to be one that cannot display all of the landmarks (in this case none of the 5 landmarks can be displayed). Hence, at step S17 and step S18, the names "Arts et Métiers Station" and "Abbesses Station" are displayed at the vicinity of the top edge of the map display region 10, the "Auber Station" and the "Assemblee Nationale Station" are displayed at the vicinity of the left edge of the map display region 10, and the "Armand Trousseau Hospital" is displayed at the vicinity of the right edge of the map display region 10.

The results of name display are as shown in the picture at the bottom of FIG. 7. Namely, message areas 20 to 22 are displayed respectively at the vicinity of the top edge, vicinity of the left edge, and vicinity of the right edge of the map display region 10 of the display 5, and the names of the first to the fifth landmarks ("Arts et Métiers station", "Abbesses Station", "Armand Trousseau Hospital", "Auber Station" and "Assemblee Nationale Station") are displayed within the respective message areas 20 to 22.

The user can intuitively ascertain the following from the display result:

(a) no landmark with a name starting with the character "a" can be seen in the vicinity of the current position P0;

(b) however, there are 5 such landmarks outside the display range of the current map; and (c) the names of these landmarks are "Arts et Métiers station", "Abbesses Station", "Armand Trousseau Hospital", "Auber Station" and "Assemblee Nationale Station".

The user determines from (a) to (c) above whether or not their intended landmark is present within the above names. When not present, input of the search keyword is modified and search performed again, and when the user's intended landmark is present within the above names, the user selects the name, and displays the intended landmark on the map. Explanation in this example is of a case in which none of the 5 landmarks are displayable on the map, however, for example, in a case in which two out of the 5 landmarks, "Arts et Métiers station" and "Abbesses Station" are displayable on the map, these 2 landmarks would be displayed on the map with a specific symbol. However, since 3 landmarks are not displayable on the map, determination at step S16 is that the scale is one with which all of the landmarks cannot be displayed, and instead of displaying the 3 landmarks "Assemblee Nationale Station", "Auber Station" and "Armand Trousseau Hospital" with the specific symbol, list-display is performed at the inside of the rectangular frames. Due to list-display having a different display state to that of the specific symbol display, this enables a user to readily discriminate which landmarks are positioned within the map display, and which landmarks are positioned outside of the map display.

Various methods can be considered for "displaying the intended landmark on the map". For example, a detector may be provided for detecting that a user has selected a given name displayed in the message areas 20 to 22, and configuration made such that in response to the detection result of the detector, the center of the map jumps, or automatically scrolls, to the position of the intended landmark (for example, the latitude and longitude of "Arts et Metiers station" when this is the landmark selected). Accordingly, by merely selecting the desired name, a user can display the intended landmark (in this case "Arts et Metiers station") on the map straight away.

An on-focus-event of the message areas 20 to 22 can be, for example, employed as the above "detector". An on-focus-event is an event generated in response to selection (focusing on) of a control (in this case the message areas 20 to 22) target. Configuration may be made such that, in the procedure for this event, programming is made with code for acquiring from the supplementary data 6b the position of the selected name (for example, the latitude and longitude of the "Arts et Métiers Station" when this is selected), and with code for jumping, or automatically scrolling, such that this position becomes the center of the map.

As explained above, in the exemplary embodiment, landmarks on the map are searched for that have names matching, or partly matching, the input search character string, and in addition to being able to adjust the position of the map display such that the found landmarks are included, each time a new character is added to the search character string during input, a new search is performed and the landmarks can be refined, and the position of the map display can be changed according to the number and position of the landmarks that change due to refining the search. Accordingly, it is possible to not only freely search for landmarks appended with a given name, but also, even when there are plural search results, since the search results can be gradually refined in steps, this results in being able to search for landmarks on a map with greater flexibility and ease.

Since the position of the map display can be moved so as to contain the position of the landmarks newly searched, or newly refined, by the addition of search characters, the latest landmarks can be checked on the map, and quick determination made as to whether the intended landmark is present.

Since the center position of the map display can be moved to the position of the landmark, from the newly searched landmarks or newly refined landmarks, positioned nearest to the current position of the center of the map display or the landmark refined to, the user can make the center of the map the landmark nearest to the current position. This is, for example, useful when searching for a gasoline stand, since a user would want to go to the nearest gasoline stand when their vehicle is running low on fuel. However, embodiments in which the center of the map is made the "nearest landmark", and refining is to the "nearest landmark" are merely best modes with emphasize on the above usefulness. From a technical perspective, focus has been made on "distance" to landmarks, however the proximity of this distance is not in principle an essential element.

When there are plural landmarks in the newly found landmarks or the newly refined landmarks, since, for example, refinement of the landmarks can be made to landmarks in a particular direction by a method other than character input, by indicating the direction (north, south, east, west) by operation of the character keys 3a, a problem associated with search refining using characters (time required) can be solved, and a simplification in operation achieved.

An example has been described above in which a "method other than character input" is a method in which "a direction (north, south, east, west) is indicated by operation of the character keys 3a", however there is no limitation thereto. For example, a key other than the character keys 3a may be employed, or a method may be employed that does not rely on key operation. Such a "method that does not rely on key operation" may be, for example, a method in which a tri-axial acceleration sensor is internally provided in the map display control apparatus 1, and the direction the body of the map display control apparatus 1 has moved in is detected by the sensor, and refinement is made to the landmarks in this detected direction. In addition, when the display 5 has a touch panel, refining may be performed in response to touch operation on the touch panel. Touch operation in such cases corresponds to instruction operation of the user relating to the position on the map.

Also, the map display control apparatus 1 according to the present embodiment may include a selector configured to select either one of means for adding the new character to the search character (see step S4) and means other than the character input (see step S12) in response to a user's operation. Thus, the landmarks may be refined by the means selected by the selector.

In the exemplary embodiment, the landmarks subject to refining are classified (grouped) into four regions 16 to 19 when directions are designated and refinement performed, however there is no limitation thereto. Namely, any configuration may be employed in which plural direction ranges are partitioned from the current center position of the map display, one of the direction ranges indicated, and refinement made to the landmarks positioned in the indicated direction range.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A map display control apparatus comprising:
   an accepting section configured to accept a search character;
   a search section configured to search for a landmark on a map, wherein a name of the landmark at least partly matching the search character;
   a position adjusting section configured to adjust a display position of the map such that the searched landmark search results appears in the map;
   a search refining section configured to perform a new search for the landmark and refine the landmark search results whenever a new character is added to the search character; and
   a position movement section configured to move the display position of the map, depending on the number of the refined landmark search results or a position of the refined landmark search results.

2. The apparatus of claim 1, wherein the position movement section is configured to move the display position of the map such that the refined landmark search results appears in the map.

3. The apparatus of claim 2, wherein the position movement section is configured to move the display position of the map such that a landmark search result positioned closest to the center of the map is positioned in the center of the map.

4. The apparatus of claim 1, further comprising:
   a second search refining section configured to refine the landmark search results through a method other than character input, when the refined landmark search results comprises a plurality of landmark search results.

5. The apparatus of claim 4, further comprising:
a third search refining section configured to refine all of the landmark search results in response to a user operation concerning the display position of the map, when at least one of the landmark search results does not appear in the map.

6. The apparatus of claim 4, further comprising:
a selector configured to select either one of the search refining section and the second search refining section so as to refine the landmarks search results either by adding the new character to the search character or by the method other than the character input in response to a user's operation, when the searched landmark search results comprises a plurality of landmark search resluts.

7. The apparatus of claim 4, wherein when the searched landmark search results comprises a plurality of landmark search results, the landmark search results are refined by a distance or a direction from a center of the map to each of the landmark search results.

8. The apparatus of claim 7, wherein the landmark search results are refined to a landmark search result positioned closest to the center of the map.

9. The apparatus of claim 7, wherein the landmark search results are refined to a landmark search result positioned in a designate direction from the center of the map.

10. The apparatus of claim 9, wherein the map is divided by a plurality of lines extending from the center of the map into a plurality of ranges, and the landmark search results are refined to a landmark search result positioned in a designate range of the ranges.

11. The apparatus of claim 10, wherein the map is divided by four lines extending from the center of the map into four ranges, and the landmark search results are refined to a landmark search result positioned in a designate range of the ranges, the designate range being designated by a cursor key.

12. The apparatus of claim 11, wherein the searched landmark search results are divided into a plurality of groups, each of the groups corresponding to one of operations, and wherein, in response to a certain operation, the landmark search results are refined to a landmark search result belonging to a group corresponding to the certain operation.

13. The apparatus of claim 1, wherein the position movement section is configured to move the display position of the map continuously.

14. A map display control method for controlling a computer to perform operations comprising:
(a) accepting a search character;
(b) searching for a landmark on a map, a name of the landmark at least partly matching the search character;
(c) adjusting a display position of the map such that the searched landmark search results appear in the map;
(d) performing a new search for the landmark and refining the landmark search results whenever a new character is added to the search character; and
(e) moving the display position of the map, depending on a number of the refined landmark search results or a position of the refined landmark search results.

15. A non-transitory computer-readable medium storing a program for controlling a computer to perform operations comprising:
(a) accepting a search character;
(b) searching for a landmark on a map, wherein a name of the landmark at least partly matches the search character;
(c) adjusting a display position of the map such that the searched landmark search results appear in the map;
(d) performing a new search for the landmark and refining the landmark search results whenever a new character is added to the search character; and
(e) moving the display position of the map, depending on a number of the refined landmark search results or a position of the refined landmark search results.

* * * * *

UNITED STATES PATENT AND TRADEMARK OFFICE
CERTIFICATE OF CORRECTION

PATENT NO.        : 8,723,892 B2
APPLICATION NO.   : 13/052230
DATED             : May 13, 2014
INVENTOR(S)       : Akihiro Nishiya Page 1 of 1

It is certified that error appears in the above-identified patent and that said Letters Patent is hereby corrected as shown below:

In the Claims

Column 10, Claim 1, Line 43, delete "matching" and insert --matches--.

Column 10, Claim 1, Line 46, delete "appears" and insert --appear--.

Column 10, Claim 1, Line 52, delete "on the" and insert --on a--.

Column 10, Claim 2, Line 57, delete "appears" and insert --appear--.

Column 10, Claim 3, Line 62, delete "the center" and insert --a center--. (1st occurrence)

Column 11, Claim 6, Line 10, delete "landmarks" and insert --landmark--.

Column 11, Claim 6, Line 14, delete "resluts" and insert --results--.

Column 11, Claim 9, Line 25, delete "designate" and insert --designated--.

Column 11, Claim 10, Line 29, delete "designate" and insert --designated--.

Column 11, Claim 11, Line 34, delete "designate" and insert --designated--.

Column 11, Claim 11, Line 35, delete "designate" and insert --designated--.

Column 12, Claim 14, Line 10, delete "map" and insert --map, wherein--.

Column 12, Claim 14, Line 11, delete "matching" and insert --matches--.

Signed and Sealed this
Second Day of June, 2015

Michelle K. Lee
*Director of the United States Patent and Trademark Office*